US008807308B2

(12) United States Patent
Suh et al.

(10) Patent No.: US 8,807,308 B2
(45) Date of Patent: Aug. 19, 2014

(54) POWER SUPPLY DEVICE, POWER ACQUISITION DEVICE AND SAFETY SYSTEM FOR ELECTROMAGNETIC INDUCTION-POWERED ELECTRIC VEHICLE

(76) Inventors: Nam Pyo Suh, Daejeon (KR); Soon Heung Chang, Daejeon (KR); Dongho Cho, Seoul (KR); Chun Taek Rim, Daejeon (KR); Jung Goo Cho, Kyunggi-do (KR); Kyung-Soo Kim, Seoul (KR); Yong Hoon Jeong, Daejeon (KR); Yong San Yoon, Daejeon (KR); Gu Ho Jeong, Daejeon (KR)

( * ) Notice: Subject to any disclaimer, the term of this patent is extended or adjusted under 35 U.S.C. 154(b) by 421 days.

(21) Appl. No.: 13/202,753

(22) PCT Filed: Feb. 11, 2010
(Under 37 CFR 1.47)

(86) PCT No.: PCT/KR2010/000856
§ 371 (c)(1),
(2), (4) Date: Mar. 30, 2012

(87) PCT Pub. No.: WO2010/098547
PCT Pub. Date: Sep. 2, 2010

(65) Prior Publication Data
US 2012/0186927 A1    Jul. 26, 2012

(30) Foreign Application Priority Data

Feb. 27, 2009 (KR) .......................... 10-2009-0016573
Jul. 24, 2009 (KR) .......................... 10-2009-0067715

(51) Int. Cl.
*B60L 9/00* (2006.01)

(52) U.S. Cl.
USPC ..................... 191/10; 191/2; 191/4; 191/45 A

(58) Field of Classification Search
CPC .......... B60L 11/16; B60L 11/14; B60L 9/00; B60L 5/005; B60L 8/003; B60L 11/182; B60L 11/1829; B60L 11/1835; B60L 2240/12; B60M 7/006; B60M 1/10; B60M 1/30; B60M 1/36
USPC .................................. 191/2–6, 10, 22 R, 45 A
See application file for complete search history.

(56) References Cited

U.S. PATENT DOCUMENTS 4,476,947 A * 10/1984 Rynbrandt ..................... 180/2.1
4,836,344 A *  6/1989 Bolger ............................ 191/10

(Continued)

FOREIGN PATENT DOCUMENTS

JP      06-245326 A     9/1994
KR   10-2005-0106313 A   11/2005

(Continued)

OTHER PUBLICATIONS

International Search Report for PCT/KR2010/000856 mailed Sep. 17, 2010.

*Primary Examiner* — Jason C Smith
(74) *Attorney, Agent, or Firm* — Wolf, Greenfield & Sacks, P.C.

(57) ABSTRACT

It is provided a power supply device and a power acquisition device for an electromagnetic induction-powered electric vehicle that increase a power transfer efficiency by maximizing a lateral deviation tolerance and by minimizing a gap between the power acquisition device and the power supply device while preventing the power acquisition device from colliding with an obstacle present on a road and being damaged by the collision.

22 Claims, 14 Drawing Sheets

(56) References Cited

U.S. PATENT DOCUMENTS

| | | | |
|---|---|---|---|
| 5,045,646 A * | 9/1991 | Musachio | 191/6 |
| 5,134,254 A * | 7/1992 | Musachio | 191/6 |
| 5,595,271 A * | 1/1997 | Tseng | 191/4 |
| 6,101,952 A * | 8/2000 | Thornton et al. | 104/282 |
| 6,471,020 B1 * | 10/2002 | Hernandez | 191/2 |
| 6,879,889 B2 * | 4/2005 | Ross | 701/22 |
| 7,611,212 B2 | 11/2009 | Nakayama et al. | |
| 7,825,537 B2 * | 11/2010 | Freer | 307/42 |
| 8,113,310 B2 * | 2/2012 | Gurol et al. | 180/65.31 |
| 8,220,568 B2 * | 7/2012 | Stoicoviciu | 180/2.1 |
| 8,240,406 B2 * | 8/2012 | Stoicoviciu et al. | 180/2.1 |
| 8,360,216 B2 * | 1/2013 | Meins et al. | 191/10 |
| 8,418,824 B2 * | 4/2013 | Aguilar | 191/22 C |
| 8,561,770 B2 * | 10/2013 | Stoicoviciu | 191/10 |
| 2003/0200025 A1 * | 10/2003 | Ross | 701/200 |
| 2005/0178632 A1 * | 8/2005 | Ross | 191/10 |
| 2007/0131505 A1 * | 6/2007 | Kim | 191/14 |
| 2008/0129246 A1 * | 6/2008 | Morita et al. | 320/108 |
| 2011/0163542 A1 * | 7/2011 | Farkas | 290/2 |
| 2011/0259694 A1 * | 10/2011 | Matsumura | 191/10 |
| 2011/0315496 A1 * | 12/2011 | Bohori et al. | 191/10 |
| 2012/0055751 A1 * | 3/2012 | Vollenwyder et al. | 191/10 |
| 2012/0103741 A1 * | 5/2012 | Suh et al. | 191/10 |
| 2012/0186927 A1 * | 7/2012 | Suh et al. | 191/10 |
| 2013/0037365 A1 * | 2/2013 | Ichikawa | 191/10 |
| 2013/0037367 A1 * | 2/2013 | Aguilar | 191/22 C |

FOREIGN PATENT DOCUMENTS

| | | |
|---|---|---|
| KR | 10-0840927 B1 | 6/2008 |
| WO | WO 2007-180586 A1 | 9/2007 |

\* cited by examiner

POWER SUPPLY DEVICE, POWER ACQUISITION DEVICE AND SAFETY SYSTEM FOR ELECTROMAGNETIC INDUCTION-POWERED ELECTRIC VEHICLE

TECHNICAL FIELD

The present invention relates to a power supply device and a power acquisition device for an electromagnetic induction-powered electric vehicle; and, more particularly, to a power supply device and a power acquisition device for such an electric vehicle, which can enhance a power transfer efficiency thereof by minimizing a gap between the power supply device embedded in a road and the power acquisition device attached to the vehicle.

BACKGROUND ART

In case of a conventional electric vehicle or a hybrid vehicle, it is necessary to connect a plug of the electric vehicle directly to an electric charger provided at a charging station and to wait for a substantial amount of time until the batteries therein are fully charged. In addition, due to the limited capacity of the batteries, the electric vehicle may need recharging several times to make a long distance travel. Further, even if a fast-charging device is used, one hour or more may be taken to charge the battery. Even with the state-of-the-art technology, ten minutes or more may be required in charging the batteries of an electric vehicle.

Recently, a new technology capable of increasing the battery capacity and reducing the charging time of the electric vehicle has been developed to overcome these drawbacks. In accordance with this new technology, however, use of a heavier battery is required, which may adversely affect the efficiency of the vehicle and increase the manufacturing cost thereof. Further, reduction of the charging time may be achieved at the expense of the battery lifespan.

An electromagnetic induction charging system for an electric vehicle has been proposed as an alternative to the battery-type electric vehicle system; however, the former is known to suffer from the low power transfer efficiency. For instance, the PATH (Partners for Advanced Transit and Highways) team led by University of California at Berkeley has developed an electromagnetic induction charging system for an electric vehicle that allows the electric vehicle to operate with a gap of at most 7 cm between a primary coil embedded in the road and a secondary coil attached to the electric vehicle. In this connection, when the gap between the primary and the secondary coils has a shorter distance than 7 cm, it has been reported that a power transfer efficiency of about 60% can be achieved by the electromagnetic induction charging system developed by the PATH. However, when the primary and the secondary coils are spaced apart by a distance of 7 cm, the power transfer efficiency of this electromagnetic induction charging system falls below a practicable level. Further, from the realistic point of view, even the gap of 7 cm between the primary and the secondary coils is too short a distance, since a typical gap between a bottom of a vehicle and a surface of the road is about 20 to 30 cm.

Another problem associated with the prior art electromagnetic induction charging system for an electric vehicle lies in the limited freedom of lateral movement or deviation. When E-shaped magnetic cores having a lateral width of about 100 cm are used for a power supply device and a power acquisition device, respectively, and if a center of the power acquisition device attached to the electric vehicle is deviated 5 cm or more from a center of the power supply device to a lateral direction, the primary coil winding around the center portion of the magnetic core of the power supply device and the secondary coil winding around the center portion of the magnetic core of the power acquisition device will get out of alignment, thereby reducing the efficiency of power transfer by 10% or more. In order to avoid such a situation, therefore, it is necessary for a driver to carefully drive an electric vehicle along the median area of a lane on the road. Otherwise, the electric vehicle needs to be equipped with, e.g., a line tracer for controlling the lateral movement thereof.

As discussed above, if the gap between the primary and the secondary coils is reduced in an effort to attain a high power transfer efficiency, the power acquisition device may collide with an obstacle present on the road and may be damaged by the collision. Further, the power transfer efficiency between the power supply device and the power acquisition device may be greatly affected by a lateral deviation of the electric vehicle. Accordingly, there has existed a need to solve these problems which have impeded the development and commercialization of an electric vehicle which acquires power by electromagnetic induction from a power supply device embedded in a road.

DISCLOSURE OF INVENTION

Technical Problem

In respect to the need discussed above, the present invention provides a power supply device and a power acquisition device for an electromagnetic induction-powered electric vehicle capable of increasing a power transfer efficiency by maximizing a lateral deviation tolerance and by minimizing a gap between the power acquisition device and the power supply device while preventing the power acquisition device from colliding with an obstacle present on the road and being damaged by the collision.

Solution to Problem

In accordance with a first embodiment of the present invention, there is provided a power supply device embedded in a road for transferring power, by electromagnetic induction, to a power acquisition device of an electric vehicle, comprising: a power supply core unit extending along a longitudinal direction of the road and having a substantially E-shaped cross section normal to the longitudinal direction of the road, the power supply core unit including a central core portion disposed at a center portion of the power supply core unit along the longitudinal direction of the road, two side core portions disposed at two opposite sides of the power supply core unit along the longitudinal direction of the road, each of the side core portions being spaced apart from the central core portion with a first space therebetween, and a base core portion disposed at a lower portion of the power supply core unit to magnetically connect the central core portion with the side core portions; and a magnetic field generating unit disposed in the first spaces between the central core portion and the side core portions, wherein the widths of the first spaces, the central core portion and the side core portions normal to the longitudinal direction of the road are substantially identical to each other, and wherein each of the side core portions has segmented core portions and second spaces therebetween disposed along the longitudinal direction of the road and the lengths of each segmented core portion and each second space along the longitudinal direction of the road are substantially identical to each other.

In accordance with a second embodiment of the present invention, there is provided a power acquisition device attached to an electric vehicle for receiving power by electromagnetic induction from a power supply device embedded in a road, comprising: a power acquisition core unit extending along a longitudinal direction of the electric vehicle and having a substantially E-shaped cross section normal to the longitudinal direction, the power acquisition core unit including a central core portion disposed at a center portion of the power acquisition core unit disposed along the longitudinal direction of the electric vehicle, two side core portions disposed at two opposite sides along the longitudinal direction of the electric vehicle, each of the side core portions being spaced apart from the central core portion with a first space therebetween, a base core portion disposed at an upper portion of the power acquisition core unit to magnetically connect the central core portion with the side core portions; and a power acquisition coil unit winding around the central core portion and disposed in the first spaces between the central core portion and the side core portions, wherein the widths of the first spaces, the central core portion and the side core portions normal to the longitudinal direction of the electric vehicle are substantially identical to each other.

In accordance with a third embodiment of the present invention, there is provided a power acquisition device attached to an electric vehicle for receiving power by electromagnetic induction from a power supply device embedded in a road, comprising: a power acquisition core unit extending along a longitudinal direction of the electric vehicle and having a substantially E-shaped cross section normal to the longitudinal direction, the power acquisition core unit including a central core portion disposed at a center portion of the power acquisition core unit disposed along the longitudinal direction of the electric vehicle, two side core portions disposed at two opposite sides along the longitudinal direction of the electric vehicle, each of the side core portions being spaced apart from the central core portion with a first space therebetween, a base core portion disposed at an upper portion of the power acquisition core unit to magnetically connect the central core portion with the side core portions; a power acquisition coil unit winding around the central core portion and disposed in the first spaces between the central core portion and the side core portions; and one or more wheel-shaped rotary magnetic field transfer members provided below each of the central core portion and the side core portions, wherein each of the transfer members includes a magnetic portion disposed at a central portion thereof and a non-magnetic portion made of a soft material and covering at least a periphery of the magnetic portion.

In accordance with a fourth embodiment of the present invention, there is provided a power acquisition device attached to an electric vehicle for receiving power by electromagnetic induction from a power supply device embedded in a road, comprising: a power acquisition core unit extending along a longitudinal direction of the electric vehicle and having a substantially E-shaped cross section normal to the longitudinal direction, the power acquisition core unit including a central core portion disposed at a center portion of the power acquisition core unit disposed along the longitudinal direction of the electric vehicle, two side core portions disposed at two opposite sides along the longitudinal direction of the electric vehicle, each of the side core portions being spaced apart from the central core portion with a first space therebetween, a base core portion disposed at an upper portion of the power acquisition core unit to magnetically connect the central core portion with the side core portions; a power acquisition coil unit winding around the central core portion and disposed in the first spaces between the central core portion and the side core portions; and a plurality of magnetic brushes attached to lower end surfaces of the central core portion and the side core portions, wherein the magnetic brushes have a predetermined vertical length so that the brushes make contact with a surface of the road.

In accordance with a fifth embodiment of the present invention, there is provided a power acquisition tire for functioning as a wheel of an electric vehicle operating with power transferred by electromagnetic induction from a power supply device embedded in a road, comprising: a tire having a space thereinside; a power acquisition core unit having a substantially E-shaped cross section including a central core portion disposed along a circumferential direction of the tire at a center portion of an inner surface of the tire, a couple of side core portions disposed along the circumferential direction of the tire at the inner surface of the tire with the central core portion therebetween, and a base core portion disposed at an opposite side of the inner surface of the tire to magnetically connect the central core portion with the side core portions; and a power acquisition coil unit disposed along spaces between the central core portion and the side core portions.

In accordance with a sixth embodiment of the present invention, there is provided a safety system for preventing a power acquisition device attached to an electromagnetic induction-powered electric vehicle from colliding with an obstacle present on a road, comprising: a supporting member for holding the power acquisition device; a link member for connecting a bottom surface of the electric vehicle with the supporting member, one end portion of the link member being hingedly connected to the bottom surface of the electric vehicle so that the link member pivotally moves about a hinge axis in a back-and-forth direction within a plane perpendicular to a surface of the road, the other end portion of the link member being hingedly connected to the supporting member; a shock absorber attached to a front end portion of the supporting member to absorb shock from the obstacle; and a protection plate attached to a front end portion of the shock absorber extending obliquely with respect to a longitudinal direction of the electric vehicle, wherein the link member is rotated upwardly about the hinge axis when the obstacle collides with the protection plate.

In accordance with a seventh embodiment of the present invention, there is provided an electromagnetic induction charging system for an electric vehicle, comprising the inventive power supply device and the power acquisition device in accordance with one of the embodiments of the present invention.

BRIEF DESCRIPTION OF DRAWINGS

The above and other objects and features of the present invention will become apparent from the following description of embodiments given in conjunction with the accompanying drawings, in which.

MODE FOR THE INVENTION

Hereinafter, preferred embodiments of the present invention will be described in detail with reference to the accompanying drawings.

Figure 1:
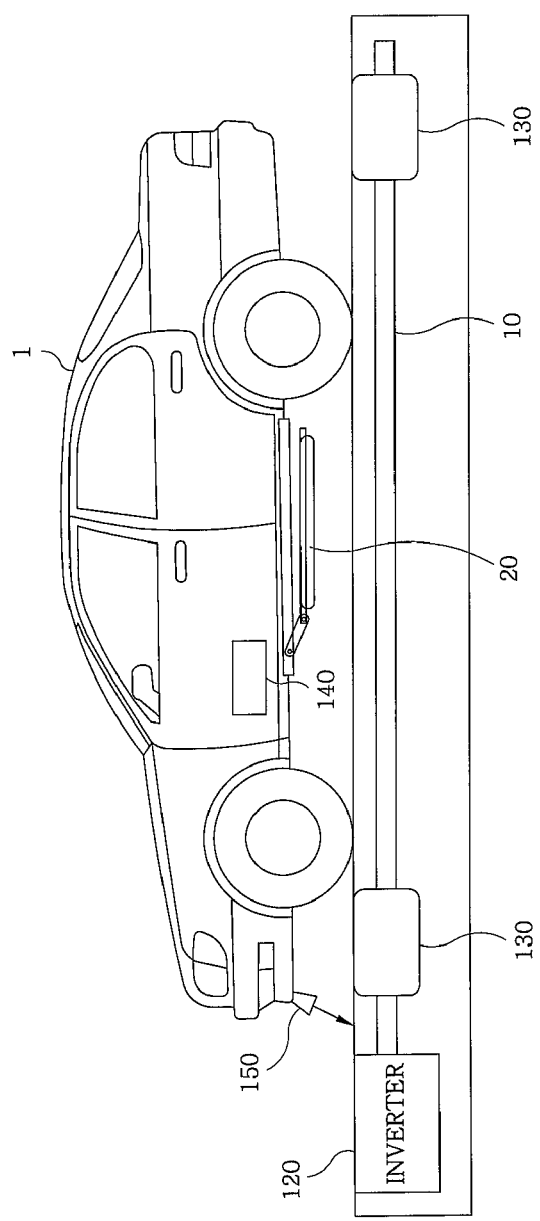
FIG. 1 schematically shows an electromagnetic induction charging system for an electric vehicle in accordance with the present invention.

FIG. 1 schematically shows an electromagnetic induction charging system for an electric vehicle in accordance with the present invention. As shown in FIG. 1, the electromagnetic induction charging system includes an electromagnetic induction-powered electric vehicle 1, a power supply device 10 embedded in a road for transferring power, a power acquisition device 20 attached to the electric vehicle for receiving, by magnetic induction, power from the power supply device 10, an inverter 120 for supplying the power supply device 10 with a high-frequency electric current, a pair of electric vehicle sensors 130 installed at a front end and a back end portions of the power supply device 10 for generating a detection signal for the electric vehicle, batteries 140 for charging electric power thereto and driving the electric vehicle, and an obstacle sensor 150 for detecting an obstacle present in front of the electric vehicle.

In accordance with the electromagnetic induction charging system of the present invention, when a detection signal is received from the electric vehicle sensors 130 or when an electric power level thus measured is higher than a predetermined reference value, it is determined that there is an electric vehicle present on a road. On the other hand, when no detection signal is received from the electric vehicle sensors and when an electric power level thus measured is lower than the predetermined reference value, it is determined that there is no electric vehicle present on the road.

If it is determined that there is an electric vehicle present on the road, the inverter 120 applies a high-frequency electric current to a magnetic field generating unit of the power supply device 10 to generate magnetic fields. The magnetic fields induce a voltage in a power acquisition coil of the power acquisition device 20 and the batteries 140 are charged with the induced voltage.

If it is determined that there is no electric vehicle present on the road, the inverter 120 applies no high-frequency electric current to the magnetic field generating unit of the power supply device 10.

Since the batteries 140 may be used when the electric vehicle is not on the road when the power supply device 10 is embedded, the capacities of the batteries 140 may be reduced. For example, the capacities of the batteries 140 may be one fifth of those of the conventional batteries for a conventional battery-type electric vehicle.

Figure 2:
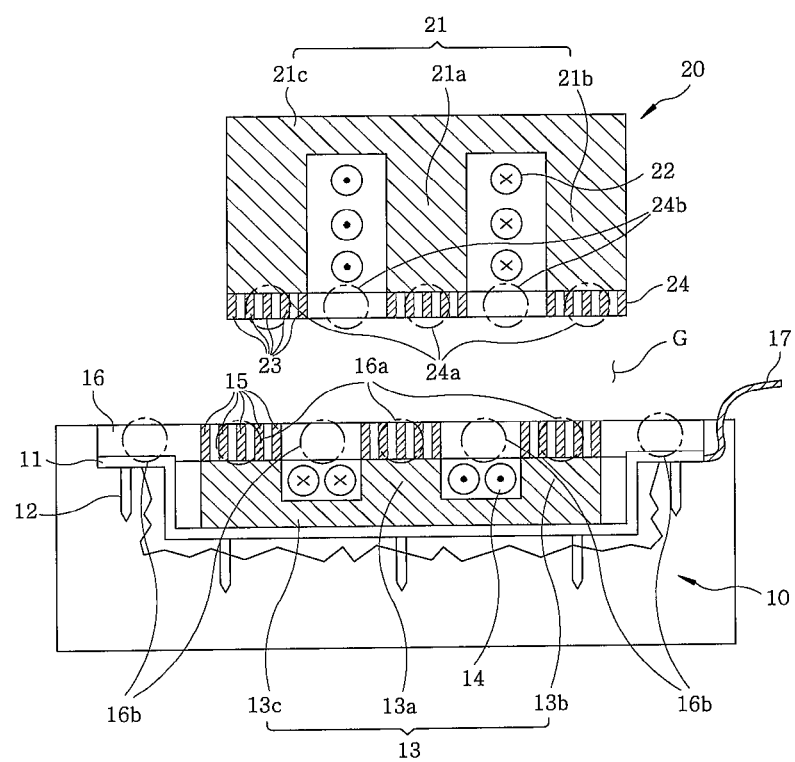
FIG. 2 is a cross-sectional view of a power supply device in accordance with the first embodiment and a power acquisition device in accordance with the second embodiment of the present invention.

FIG. 2 shows a cross-sectional view of a power supply device in accordance with the first embodiment of the present invention.

Referring to FIG. 2, a power supply device 10 for transferring power is embedded in a road and a power acquisition device 20 receives the power from the power supply device 10 by electromagnetic induction. A vertical gap G is formed between the power supply device 10 and the power acquisition device 20.

The power supply device 10 may extend for a length of 30-300 m in a longitudinal direction of the road. The length of the power supply device 10 may be modified with any other predetermined length.

The power supply device 10 includes a base plate 11, a plurality of plate-fixing anchors 12, a power supply core unit 13, a magnetic field generating unit 14, a plurality of magnetic pins 15, a power supply device protection cover 16 and a grounding wire 17.

The base plate 11 having a bended shape is made of a electrically conductive material, such as steel, and is provided in a hollow cavity that is formed by digging the road below the power supply core unit 13 to support the power supply core unit 13, the plurality of magnetic pins 15 and the power supply device protection cover 16, both of which extend along the longitudinal direction of the road. The base plate 11 is connected to the grounding wire 17.

The plurality of plate-fixing anchors 12 are provided at a lower surface of the base plate and protrude from the base plate 11 into an inner wall of the hollow cavity to fix the base plate 11 to the road.

The power supply core unit 13 extending along the longitudinal direction of the road has a substantially E-shaped cross section normal to the longitudinal direction of the road and includes a central core portion 13a, a couple of side core portions 13b and a base core portion 13c.

The central core portion 13a is disposed at a center portion of the power supply core unit 13 along the longitudinal direction. The two side core portions 13b are disposed at two opposite sides of the power supply core unit 13 along the longitudinal direction of the road. Each of the side core portions 13b is spaced apart from the central core portion 13a to have a supply core space therebetween. The base core portion 13c is disposed at a lower portion of the power supply core unit 13 to magnetically connect the central core portion 13a with the side core portions 13b.

The magnetic field generating unit 14 supplied with an alternating electric current from an inverter is disposed in the supply core spaces defined between the central core portion 13a and the side core portions 13b, thereby winding around the central core portion 13a.

The magnetic pin 15 may be made of a composite magnetic material, having a similar wear resistance to that of the material of which the road is made and including a ferrite material, and have a substantially pin-shaped form.

The power supply device protection cover 16 is made of a material having a similar wear resistance to that of the material of which the road is made, such as cement, asphalt, FRP (fiber glass reinforced plastic) and PVC (polyvinyl chloride). The power supply device protection cover 16 is arranged on the central core portion 13a, the side core portions 13b, the supply core spaces between the central core portion 13a and each of the side core portions 13b and parts of the base plate 11 to cover them so that they are not exposed over a surface of the road. A lower surface of the power supply protection cover 16 makes contact with upper surfaces of the central core portion 13a, the side core portions 13b and the parts of the base plate 11. An upper surface of the power supply device protection cover 16 is substantially coplanar with the surface of the road in such a manner that the power supply device protection cover 16 does not protrude or concave therefrom.

The power supply protection cover 16 includes magnetic portions 16a arranged on the central core portion 13a and the side core portions 13b, throughout which the magnetic pins 15 are distributed, and non-magnetic portions 16b arranged on the supply core spaces between the central core portion 13a and each of the side core portions 13b and the parts of the base plate 11. The magnetic flux flowing from the central core portion 13a and the side core portions 13b is efficiently transferred to the power acquisition device 20 through the magnetic portions 16a. Lower end portions of the magnetic pins 15 stuck into the magnetic portions 16a make contact with the upper surfaces of the central core portion 13a and the side core portions 13b, and upper end portions thereof are substantially coplanar with the upper surface of the power supply device protection cover 16 so that the magnetic pins 15 do not protrude or concave from the upper surface of the power supply device protection cover 16.

The grounding wire 17 connects the base plate 11 to the ground so that the base plate 11 is prevented from being electrified due to a deterioration or defect of the magnetic field generating unit 14.

In the power supply device 10 configured as above, an insulation molding using an appropriate material, such as wax or silicon, is provided between the power supply core unit 13 and the base plate 11, and an insulation molding using a proper material, such as cement or asphalt, is provided between the base plate 11 and the inner wall of the cavity of the road. From the viewpoint of maintenance and repair, it is preferred that no insulation molding is formed between the magnetic field generating unit 14 and the power supply core unit 13.

FIG. 2 also shows a cross sectional view of a power acquisition device in accordance with the second embodiment of the present invention.

Referring to FIG. 2 again, a power acquisition device 20 for receiving power by magnetic induction is attached to an electromagnetic induction-powered electric vehicle.

The power acquisition device 20 may extend for a length of about 1-2 m in a longitudinal direction of an electric vehicle. The length of the power acquisition device 20 may be modified with another predetermined length.

The power acquisition device 20 includes a power acquisition core unit 21, a power acquisition coil 22, a plurality of magnetic pins 23 and a power acquisition device protection cover 24.

The power acquisition core unit 21 extending along the longitudinal direction of the electric vehicle has a substantially E-shaped cross section normal to the longitudinal direction of the electric vehicle and includes a central core portion 21a, a couple of side core portions 21b and a base core portion 21c.

The central core portion 21a is disposed at a center portion of the power acquisition core unit 21. The two side core portions 21b are disposed at two opposite sides along the longitudinal direction of the electric vehicle. Each of the side core portions 21b is spaced apart from the central core portion 21a to have an acquisition core space therebetween. The base core portion 21c is disposed at an upper portion of the power acquisition core unit 21 to magnetically connect the central core portion 21a with the side core portions 21b.

The power acquisition coil 22 connected to batteries of the electric vehicle for charging are disposed in spaces defined between the central core portion 21a and the side core portions 21b, thereby winding around the central core portion 21a.

The magnetic pin 23 is made of a composite magnetic material including a ferrite material and has a pin-shaped form.

The power acquisition device protection cover 24 is arranged under the central core portion 21a, the side core portions 21b and the acquisition core spaces to cover them in such a way that they are not exposed to a surface of the road. An upper surface of the power acquisition protection cover 24 makes contact with lower surfaces of the central core portion 21a and the side core portions 21b.

The power acquisition device protection cover 24 includes magnetic portions 24a arranged under the central core portion 21a and the side core portions 21b, throughout which the magnetic pins 23 are distributed, and non-magnetic portions 24b arranged under the acquisition core spaces. The magnetic flux flowing from the power supply device 10 is efficiently transferred to the power acquisition core unit 21 through the magnetic portions 24a. Upper end portions of the magnetic pins 23 stuck into the magnetic portions 24a make contact with the lower surfaces of the central core portion 21a and the side core portions 21b, and lower end portions thereof are substantially coplanar with a lower surface of the power acquisition device protection cover 24 so that the magnetic pins 23 do not protrude or concave from the lower surface of the power acquisition device protection cover 24.

Figure 3:
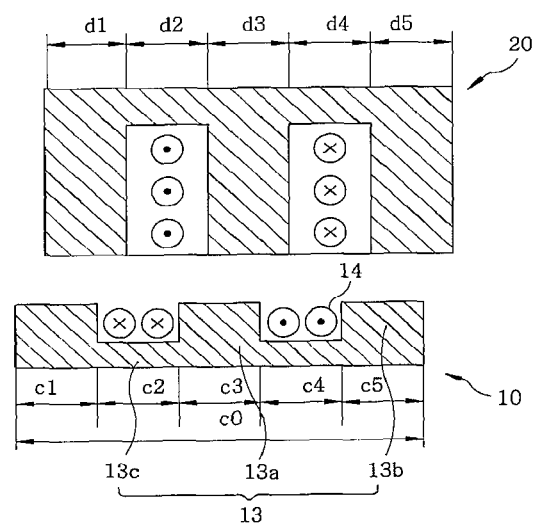
FIG. 3 is a cross-sectional view illustrating exemplary core structures of the power supply device and the power acquisition device in accordance with the first and the second embodiments of the present invention.

FIG. 3 is a cross-sectional view illustrating exemplary core structures of the power supply device and the power acquisition device in accordance with the first and the second embodiments of the present invention.

Referring to FIG. 3, equally-spaced core structures of the first and the second embodiments are designed to satisfy a conditional equation:

$$c1=c2=c3=c4=c5=d1=d2=d3=d4=d5.$$

In particular, the central core portion 13a of the power supply device 10 has a width c3 normal to the longitudinal direction of the road. Each of the side core portions 13b of the power supply device 10 having a width c1 or c5 normal to the longitudinal direction of the road is spaced apart from the central core portion 13a to have the supply core space therebetween, having a width c2 or c4 normal to the longitudinal direction of the road. The width c3 of the central core portion 13a is set substantially identical to that of c1 or c5 of the side core portions 13b. The core width c1, c3 or c5 of the power supply core unit 13 is set substantially identical to the width of c2 or c4 of the supply core space. The power acquisition device 20 may also have the same structure as the equally-spaced core structure of the power supply device 10 described above.

In case of a power supply device employed in a prior art electromagnetic induction charging system, the output voltage drops sharply due to an imbalance in the intervals between the cores when a lateral deviation is developed.

Thus, the above equally-spaced core structure makes it possible to reduce, to certain degrees, the adverse effect of the lateral deviation over the total width c0. However, although the core widths and the widths of the core spaces therebetween are set to substantially identical to each other, since the magnetic flux from the central core portion is divided into two side core portions, the quantity of the magnetic flux passing through a cross section of the central core portion parallel to the road surface is twice as great as that passing through a cross section of each of the side core portions parallel to the road surface. This means that, in order to ensure a uniform magnetic-flux density, the area of the cross section of the central core portion through which the magnetic flux passes needs to be twice as great as that of each of the side cores.

Figure 4:
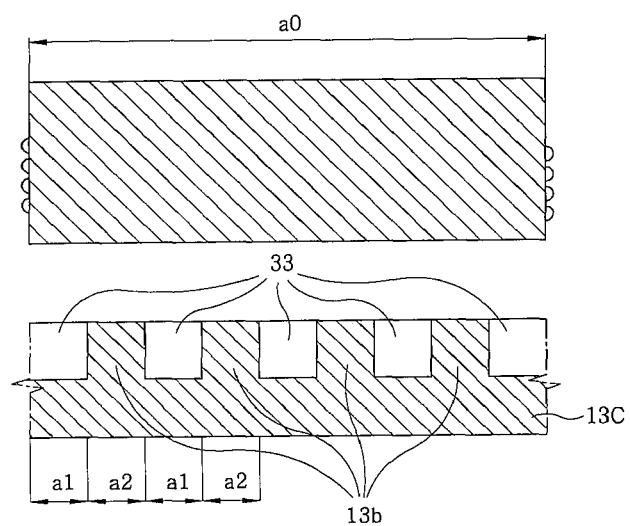
FIG. 4 is a side view showing the exemplary core structure of the power supply device shown in FIG. 3.

FIG. 4 is a side view showing an exemplary core structure of the power supply device in accordance with the first embodiment.

Referring to FIG. 4, the central core portion 13a continuously extends along the longitudinal direction of the road but each of the side core portions 13b has segmented core portions and side core spaces therebetween disposed along the longitudinal direction of the road and the lengths of each segmented core portion and each side core space along the longitudinal direction of the road are set substantially identical to each other so that the area of the cross section of the central core portion 13a, through which the magnetic flux passes, parallel to the surface of the road becomes twice as great as that of each of the side core portions 13b. Non-magnetic support members 33 for supporting a load from the power supply device protection cover 16 and the electric vehicle are inserted into the side core spaces of each of the side core portions 13b. By using the exemplary core structure, the magnetic flux density in the central core portion 13a is set substantially identical to that of each of the side core portions 13b. Thus, a maximum lateral deviation tolerance becomes equal to one fifth of a total core width c0 of the power supply core unit 13, where the maximum lateral deviation tolerance is defined as the value of a lateral deviation when the measured power transfer efficiency is reduced by 10% compared with that measured under a condition where there is virtually no lateral deviation between the power supply device 10 and the power acquisition device 20. For example, the maximum lateral deviation tolerance becomes as great as 20 cm in case where the width c0 of the power supply core unit 13 is equal to 100 cm.

The power supply core unit 13 and the magnetic field generating unit 14 may extend along the road in a sinusoidal wave shape.

Figure 5:
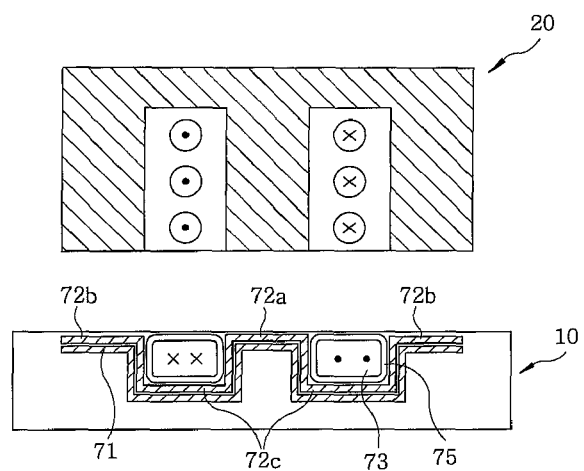
FIG. 5 is a cross-sectional view describing another exemplary core structure of the power supply device in accordance with the first embodiment of the present invention.

FIG. 5 is a cross-sectional view describing another exemplary core structure of the power supply device in accordance with the first embodiment of the present invention.

As shown in FIG. 5, the power supply device 10 of a plate structure has the same configurations as the power supply device 10 illustrated in FIG. 2 except the shapes of the base plate 71 and the core plate 72, and the presence of an insulating film 75.

The base plate 71 provided for supporting the core plate 72 and the magnetic field generating unit 73 has a structure of a bended plate shape. In particular, some parts of the base plate 71 arranged at sides of the magnetic field generating unit 73 protrude toward the surface of the road and the other parts of the base plate 71 arranged under the magnetic field generating unit 73 concave from the surface of the road.

Similarly, the core plate 72 made of a magnetic material has a structure of a bended plate shape. In particular, the central core portion 72a and the side core portions 72b of the core plate 72 protrude toward the road surface and the base core portion 72c of the core plate 72 recesses from the road surface.

The magnetic field generating unit 73 supplied with alternating electric current is surrounded by the insulating film 75. The magnetic field generating unit 73 and the insulating film 75 are disposed in supply core spaces defined between the central core portion 72a and the side core portions 72b to thereby wind around the central core portions 72a.

Figure 6:
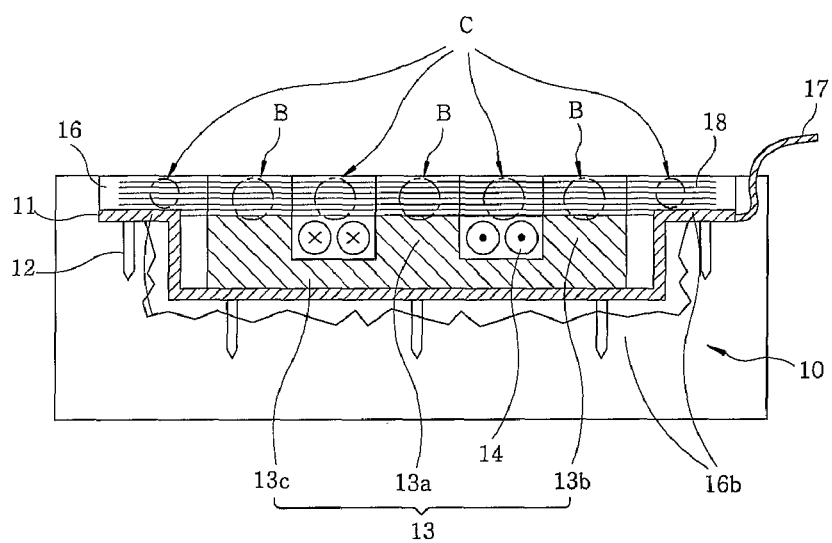
FIG. 6 is a cross-sectional view showing an exemplary power supply device protection cover of the power supply device in accordance with the first embodiment of the present invention.

FIG. 6 is a cross-sectional view showing an exemplary power supply device protection cover of the power supply device in accordance with the first embodiment of the present invention.

Referring to FIG. 6, the protection cover 16 is made of a material having a similar wear resistance to that of the material of which the road is made, such as cement, asphalt, FRP (fiber glass reinforced plastic) and PVC (polyvinyl chloride) and a fiber-shaped non-magnetic material 18 (e.g., glass fiber or plastic fiber) having an increased tensile strength.

In this case, the protection cover 16 includes a magnetic composite material portion B and a non-magnetic composite material portion C.

The magnetic composite material portion B may include cement, a magnetic material and a fiber-shaped non-magnetic material; or asphalt, a magnetic material and a non-magnetic reinforcing material. The magnetic composite material portion B has similar physical properties to those of a general cement-paved or asphalt-paved road except that it can transfer a magnetic flux therethrough.

The non-magnetic composite material portion C may include cement and a fiber-shaped non-magnetic material; or asphalt and a non-magnetic reinforcing material. The non-magnetic composite material portion C has similar physical properties to those of a general cement-paved or asphalt-paved road.

The fiber-shaped non-magnetic material is dispersed throughout the power supply protection cover 16, so that the boundary portion between the magnetic composite material portion and the non-magnetic composite material portion are fixed to each other by the fiber-shaped non-magnetic material. The power supply protection cover 16 is bonded to the paved road by the bonding force of cement or asphalt. Since the power supply protection cover 16 is made of a material similar to that of the material paving the road, the thermal expansion coefficients of the power supply protection cover 16 and the pavement material of the road are similar to each other. This will help minimize occurrences of cracks and water seepage in the border between the protection cover 16 and the road pavement.

Figure 7:
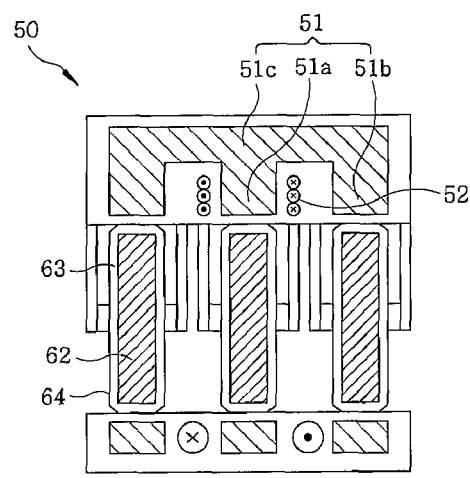
FIGS. 7 and 9 show cross-sectional views of a power acquisition device in accordance with the third embodiment of the present invention.
Figure 9:
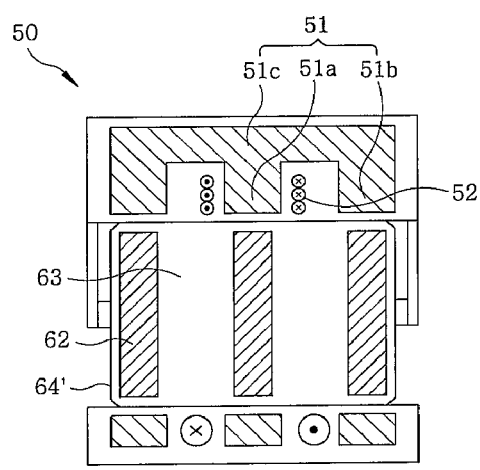

FIGS. 7 and 9 show cross-sectional views of a power acquisition device in accordance with the third embodiment of the present invention.

As shown in FIGS. 7 and 9, the power acquisition device that receives power, for an electric vehicle, from a power supply device embedded in a road by electromagnetic induction includes a power acquisition core unit 51, a power acquisition coil 52 and one or more wheel-shaped rotary magnetic field transfer members 64 or 64'.

The power acquisition core unit 51 extending along a longitudinal direction of the electric vehicle has a substantially E-shaped cross section normal to the longitudinal direction of the electric vehicle and includes a central core portion 51a, a couple of side core portions 51b and a base core portion 51c.

The central core portion 51a is disposed at the center portion of the power acquisition core unit 51. The two side core portions 51b are disposed at opposite sides of the central core portion 51a. Each of the side core portions 51b is spaced apart from the central core portion 51a to have an acquisition core space. The base core portion 51c is disposed at an upper portion of the power acquisition core unit 51 to magnetically connect the central core portion 51a with the side core portions 51b.

The power acquisition coil 52 connected to the batteries of the electric vehicle for charging is disposed in the acquisition core spaces between the central core portion 51a and the side core portions 51b, thereby winding around the central core portion 51a.

Each of the wheel-shaped rotary magnetic field transfer members 64 or 64' includes a magnetic portion 62 disposed at a central portion thereof and a non-magnetic portion 63 covering a periphery of the magnetic portion 62. The magnetic portion 62 is made of a magnetic material including a ferrite material. The non-magnetic portion 63 is made of a soft material such as a material of the tire including rubber.

The one or more wheel-shaped rotary magnetic field transfer members 64 or 64' are provided below each of the central core portion 51a and the side core portions 51b for transferring magnetic fluxes from the power supply device to the power acquisition core unit 51.

Each of the wheel-shaped rotary magnetic field transfer members 64 may be divided into three parts so that each of the three parts corresponds to the central core portion 51a or each of the side core portions 51b.

Alternatively, each of the wheel-shaped rotary magnetic-field transfer members 64' may be consolidated into a single part having three magnetic core portions 62 therein so that each of the magnetic portions 62 corresponds to the central core portion 51a or one of the side core portions 51b, respectively, as illustrated in the FIG. 9.

Figure 8:
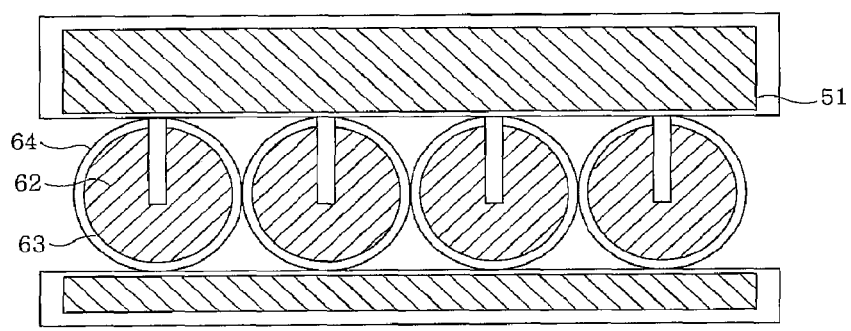
FIG. 8 schematically describes a side view of the power acquisition device in accordance with the third embodiment of the present invention.

FIG. 8 schematically describes a side view of the power acquisition device in accordance with the third embodiment of the present invention.

As shown in FIG. 8, two or more wheel-type magnetic field transfer members 64 or 64' are arranged in a row along the longitudinal direction of the electric vehicle.

Figure 10:
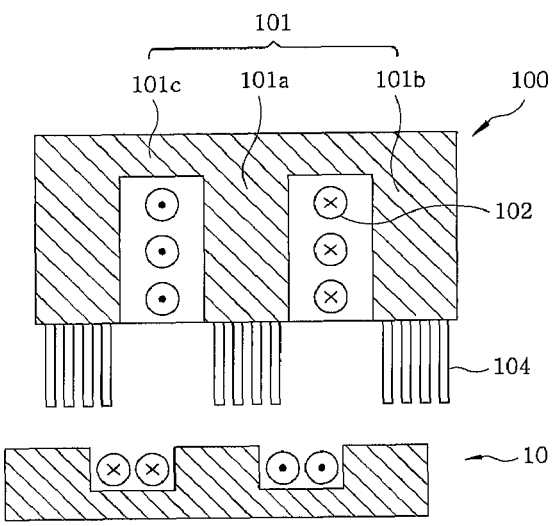
FIG. 10 is a cross-sectional view of a power acquisition device in accordance with the fourth embodiment of the present invention.
Figure 11:
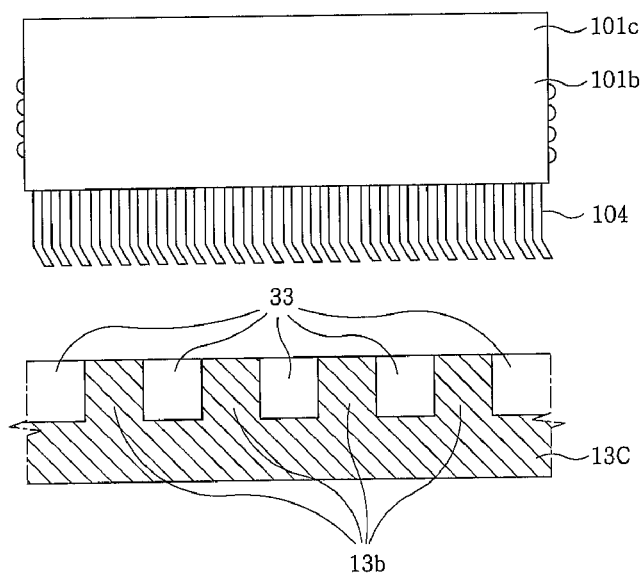
FIG. 11 schematically shows a side view of the power acquisition device in accordance with the fourth embodiment of the present invention.

FIGS. 10 and 11 are a cross-sectional view and a side view of a power acquisition device in accordance with the fourth embodiment of the present invention.

As shown in FIG. 10, a brush-type power acquisition device 100 for an electromagnetic induction-powered electric vehicle includes a power acquisition core unit 101, a power acquisition coil 102 and a plurality of magnetic brushes 104 made of a magnetic material including silicon steel or amorphous metal.

The power acquisition core unit 101 extending along a longitudinal direction of the electric vehicle has a substantially E-shaped cross section normal to the longitudinal direction of the electric vehicle and includes a central core portion 101a, a couple of side core portions 101b and a base core portion 101c.

The central core portion 101a is disposed at a center portion of the power acquisition core unit 101. The two side core portions 101b are disposed at opposite sides of the central core portion 101a. Each of the side core portions 101b is spaced apart from the central core portion 101a to have a supply core space therebetween. The base core portion 101c is disposed at an upper portion of the power acquisition core unit 101 to magnetically connect the central core portion 101a with the side core portions 101b.

The power acquisition coil 102 connected to the batteries of the electric vehicle for charging is disposed in spaces defined between the central core portion 101a and the side core portions 101b, thereby winding the central core portion 101a.

The plurality of the magnetic brushes 104 are attached to lower end surfaces of the central core portion 101a and the side core portions 101b and have predetermined vertical lengths so that they can make contact with a surface of the road.

Use of the magnetic brushes makes it possible to minimize a gap between a power supply device and a power acquisition device to thereby increase the power transfer efficiency and reduce the influence of a vertical fluctuating movement of the power acquisition device.

Figure 12:
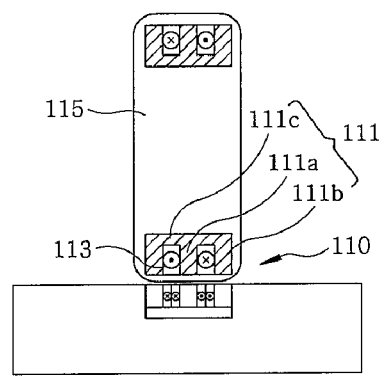
FIG. 12 shows a cross-sectional view of a power acquisition tire in accordance with the fifth embodiment of the present invention.

FIG. 12 shows a cross-sectional view of a power acquisition tire in accordance with the fifth embodiment of the present invention.

As shown in FIG. 12, the power acquisition tire 110 for functioning as a wheel of an electromagnetic induction-powered electric vehicle includes a tire 115 having a space thereinside, a power acquisition core unit 111 and a power acquisition coil 112.

The power acquisition core unit 111 having a substantially E-shaped cross section includes a central core portion 111a, a couple of side core portions 111b and a base core portion 111c.

The central core portion 111a is disposed along a circumferential direction of the tire at a center portion of an inner surface of the tire 115. The side core portions 111b are disposed along the circumferential direction of the tire at the inner surface of the tire with the central core portion 111a therebetween. The base core portion 111c is disposed at an opposite side of the inner surface of the tire 115 to magnetically connect the central core portion 101a with the side core portions 101b.

The power acquisition core unit 111 is preferably made of a pliable material that can be deformed in concert with the deformation of the tire.

The power acquisition coil 112 connected to the batteries of the electric vehicle for charging is disposed along spaces surrounded by the central core portion 111a, each of the side core portions 111b and the base core portion 111c.

Use of the power acquisition tire may prevent the power acquisition device from colliding with an obstacle present on the road, while minimizing a gap between a power supply device and a power acquisition tire.

Figure 13:
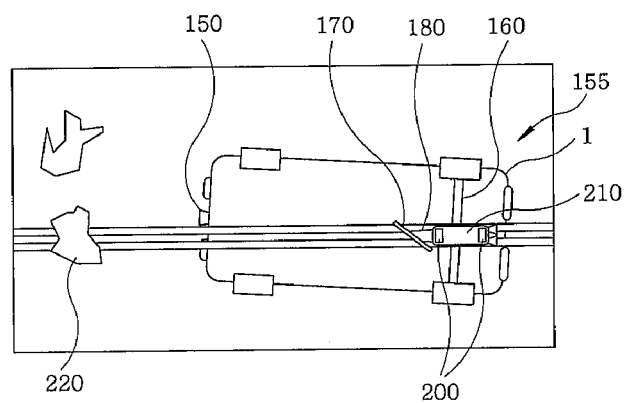
FIG. 13 is a plan view of a safety system in accordance with the sixth embodiment of the present invention viewed from a road on which an electric vehicle travels.
Figure 14:
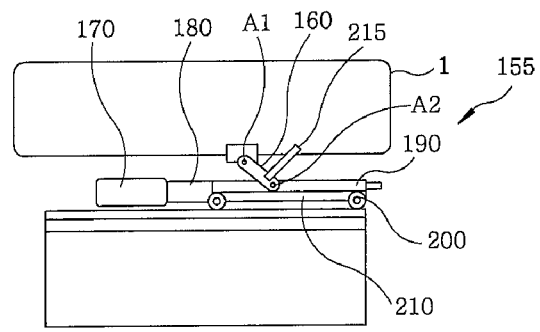
FIG. 14 is a side view of the safety system depicted in FIG. 13.

FIGS. 13 and 14 are a plan view of a safety system in accordance with the sixth embodiment of the present invention viewed from a road on which an electromagnetic induction-powered electric vehicle travels and a side view thereof.

As shown in FIG. 13, the safety system 155 for the power acquisition device 210 includes an obstacle sensor 150, a supporting member 190, a link member 160, a lifting unit 215, a shock absorber 180, a protection plate 170 and two pairs of auxiliary safety wheels 200.

In particular, the obstacle sensor 150 is provided at a front side of the electric vehicle 1 and detects an obstacle 220 present in front of the electric vehicle to generate a detection signal.

The supporting member 190 mounts the power acquisition device 210 onto a bottom surface thereof.

The link member 160 connects a bottom surface of the electric vehicle 1 with the supporting member 190. In particular, one end portion of the link member 160 is hingedly connected to the bottom surface of the electric vehicle 1 so that the link member 160 can pivotally move about a hinge axis A1 in a back-and-forth direction within a plane perpendicular to a road surface. The other end portion of the link member 160 is hingedly connected to the supporting member 190.

The lifting unit 215 connects the link member 160 with the bottom surface of the electric vehicle 1 to rotate the link member 160. The lifting unit 215 may be an electric motor or a hydraulic cylinder.

The shock absorber 180 is attached to a front end portion of the dsupport member 190 to absorb shock generated by a collision between the obstacle 220 and the protection plate 170.

The protection plate 170 is attached to a front end portion of the shock absorber 180 to extend obliquely with respect to a longitudinal direction of the electric vehicle. When colliding with the obstacle 220, the protection plate 170 pushes the obstacle 220 laterally outwards.

The above safety system operates as explained below. When the obstacle 220 is detected by the obstacle sensor 150, the link member 160 is rotated upwardly about the hinge axis A1 by the lifting unit 215 to lift up the device support member 190. In addition, even when the obstacle collides with the protection plate 170 due to a malfunctioning of the obstacle sensor, the link member 160 is rotated upwardly about the hinge axis A1 by shock not absorbed by the shock absorber to lift up the support member 190. Since the link member 160 is hingedly connected to the supporting member 190, it is possible to keep the supporting member 190 from inclining even though the supporting member 190 is lifted upwardly by the link member 160. By virtue of the above lifting operation, the power acquisition device may be prevented from colliding with the obstacle present on the road.

Two pairs of auxiliary safety wheels 200 are arranged at the bottom surface of the support member 190. One pair of wheels are arranged at the front end portion of the supporting member 190 and the other pair of wheels are arranged at the back end portion thereof. To prevent the power acquisition device 210 from making a direct contact with the road surface, the diameter of the safety wheel 200 is made to be larger than the width in the vertical direction of the acquisition device 210.

Each of the various embodiments described above may be combined with anyone of the other embodiments. For instance, the magnetic brushes of the fourth embodiment illustrated in FIG. 10 may be applied to the power acquisition device in accordance with the second embodiment of the present invention. In addition, the power supply device in accordance with the first embodiment and the power acquisition device in accordance with one of the remaining embodiments of the present invention may be included in an electromagnetic induction charging system.

As set forth above, the present invention offers a number of critical advantages. First of all, the batteries employed in an electric vehicle are charged while it is moving along a road provided with the inventive power supply device. Needless to say, this makes it possible to avoid or minimize any battery charging time. Further, it is capable of reducing the capacities of the batteries and extending the lifespan thereof. In addition, the power transfer efficiency is greatly increased compared with that of the conventional electromagnetic induction charging system by maximizing a lateral deviation tolerance and by minimizing a vertical gap between the primary and the second coils.

While the invention has been shown and described with respect to the preferred embodiments only, it will be understood by those skilled in the art that various changes and modifications may be made without departing from the scope of the invention as defined in the following claims.

The invention claimed is:

1. A power supply device embedded in a road for transferring power, by electromagnetic induction, to a power acquisition device of an electric vehicle, comprising:
    a power supply core unit extending along a longitudinal direction of the road and having a substantially E-shaped cross section normal to the longitudinal direction of the road, the power supply core unit including a central core portion disposed at a center portion of the power supply core unit along the longitudinal direction of the road,
    two side core portions disposed at two opposite sides of the power supply core unit along the longitudinal direction of the road, each of the side core portions being spaced apart from the central core portion with a first space therebetween, and
    a base core portion disposed at a lower portion of the power supply core unit to magnetically connect the central core portion with the side core portions; and
    a magnetic field generating unit disposed in the first spaces between the central core portion and the side core portions,
    wherein each of the side core portions has segmented core portions and second spaces therebetween disposed along the longitudinal direction of the road and the lengths of each segmented core portion and each second space along the longitudinal direction of the road are substantially identical to each other.

2. The power supply device of claim 1, wherein the central core portion, the segmented core portions and the base core portion are made of a magnetic material and each of the second spaces is filled with a nonmagnetic support member.

3. The power supply device of claim 1, further comprising a base member having a bended shape and provided below the power supply core unit to support the power supply core unit.

4. The power supply device of claim 3, further comprising a grounding wire connected to the base member, the base member being made of an electrically conductive material.

5. The power supply device of claim 3, further comprising a power supply device protection cover arranged on the central core portion, the side core portions, the first spaces and parts of the base member,
    wherein a lower surface of the power supply device protection cover makes contact with upper surfaces of the central core portion, the side core portions and said parts of the base member, and an upper surface of the power supply device protection cover is substantially coplanar with a surface of the road.

6. The power supply device of claim 5, wherein the power supply device protection cover includes magnetic portions arranged on the central core portion and the side core portions and non-magnetic portions arranged on the first spaces and said parts of the base plate,
    wherein substantially pin-shaped magnetic members are distributed throughout the magnetic portions of the power supply device protection cover, and
    wherein lower end portions of the magnetic members make contact with the upper surfaces of the central core portion and the side core portions, and the upper end portions of the magnetic members are substantially coplanar with the surface of the road.

7. The power supply device of claim 6, wherein each of the power supply device protection cover and the magnetic members has a similar wear resistance as that of the road.

8. The power supply device of claim 5, wherein a fiber-shaped non-magnetic material is dispersed throughout the power supply protection cover.

9. A power acquisition device attached to an electric vehicle for receiving power by electromagnetic induction from a power supply device embedded in a road, comprising:
   a power acquisition core unit extending along a longitudinal direction of the electric vehicle and having a substantially E-shaped cross section normal to the longitudinal direction, the power acquisition core unit including
   a central core portion disposed at a center portion of the power acquisition core unit disposed along the longitudinal direction of the electric vehicle,
   two side core portions disposed at two opposite sides along the longitudinal direction of the electric vehicle, each of the side core portions being spaced apart from the central core portion with a first space there between, and
   a base core portion disposed at an upper portion of the power acquisition core unit to magnetically connect the central core portion with the side core portions; and
   a power acquisition coil unit winding around the central core portion and disposed in the first spaces between the central core portion and the side core portions,
   wherein the widths of the first spaces, the central core portion and the side core portions normal to the longitudinal direction of the electric vehicle are substantially identical to each other.

10. The power acquisition device of claim 9, further comprising a power acquisition device protection cover arranged under the central core portion, the side core portions and the first spaces,
   wherein an upper surface of the power acquisition device protection cover makes contact with lower surfaces of the central core portion and the side core portions.

11. The power acquisition device of claim 10, wherein the power acquisition device protection cover includes magnetic portions arranged under the central core portion and the side core portions and nonmagnetic portions arranged under the first spaces,
   wherein substantially pin-shaped magnetic members are distributed throughout the magnetic portions of the power acquisition device protection cover, and
   wherein upper end portions of the magnetic members make contact with the lower surfaces of the central core portion and the side core portion and the lower end portions of the magnetic members are coplanar with a lower surface of the power acquisition device protection cover.

12. A power acquisition device attached to an electric vehicle for receiving power by electromagnetic induction from a power supply device embedded in a road, comprising:
   a power acquisition core unit extending along a longitudinal direction of the electric vehicle and having a substantially E-shaped cross section normal to the longitudinal direction, the power acquisition core unit including
   a central core portion disposed at a center portion of the power acquisition core unit disposed along the longitudinal direction of the electric vehicle,
   two side core portions disposed at two opposite sides along the longitudinal direction of the electric vehicle, each of the side core portions being spaced apart from the central core portion with a first space therebetween, and
   a base core portion disposed at an upper portion of the power acquisition core unit to magnetically connect the central core portion with the side core portions;
   a power acquisition coil unit winding around the central core portion and disposed in the first spaces between the central core portion and the side core portions; and
   one or more wheel-shaped rotary magnetic field transfer members provided below each of the central core portion and the side core portions,
   wherein each of the transfer members includes a magnetic portion disposed at a central portion thereof and a nonmagnetic portion made of a soft material and covering at least a periphery of the magnetic portion.

13. The power acquisition device of claim 12, wherein the soft material includes rubber.

14. A power acquisition device attached to an electric vehicle for receiving power by electromagnetic induction from a power supply device embedded in a road, comprising:
   a power acquisition core unit extending along a longitudinal direction of the electric vehicle and having a substantially E-shaped cross section normal to the longitudinal direction, the power acquisition core unit including
   a central core portion disposed at a center portion of the power acquisition core unit disposed along the longitudinal direction of the electric vehicle,
   two side core portions disposed at two opposite sides along the longitudinal direction of the electric vehicle, each of the side core portions being spaced apart from the central core portion with a first space therebetween, and
   a base core portion disposed at an upper portion of the power acquisition core unit to magnetically connect the central core portion with the side core portions;
   a power acquisition coil unit winding around the central core portion and disposed in the first spaces between the central core portion and the side core portions; and
   a plurality of magnetic brushes attached to lower end surfaces of the central core portion and the side core portions,
   wherein the magnetic brushes have a predetermined vertical length so that the brushes make contact with a surface of the road.

15. The power acquisition device of claim 14, wherein the magnetic brush is made of a magnetic material including silicon steel.

16. The power acquisition device of claim 14, wherein the magnetic brush is made of a magnetic material including amorphous metal.

17. A power acquisition tire for functioning as a wheel of an electric vehicle while receiving power by electromagnetic induction from a power supply device embedded in a road, comprising:
   a tire having a space thereinside;
   a power acquisition core unit having a substantially E-shaped cross section including
   a central core portion disposed along a circumferential direction of the tire at a center portion of an inner surface of the tire,
   a couple of side core portions disposed along the circumferential direction of the tire at the inner surface of the tire with the central core portion therebetween, and
   a base core portion disposed at an opposite side of the inner surface of the tire to magnetically connect the central core portion with the side core portions; and
   a power acquisition coil unit disposed along spaces between the central core portion and the side core portions.

18. The power acquisition tire of claim 17, wherein the power acquisition core unit is made of a pliable material so that the power acquisition core unit is deformed in concert with deformation of the tire.

19. A safety system for preventing a power acquisition device attached to an electromagnetic induction-powered electric vehicle from colliding with an obstacle present on a road, comprising:
   a supporting member for holding the power acquisition device;

a link member for connecting a bottom surface of the electric vehicle with the supporting member, one end portion of the link member being hingedly connected to the bottom surface of the electric vehicle so that the link member pivotally moves about a hinge axis in a back-and-forth direction within a plane perpendicular to a surface of the road, the other end portion of the link member being hingedly connected to the supporting member;

a shock absorber attached to a front end portion of the supporting member to absorb shock from the obstacle; and a protection plate attached to a front end portion of the shock absorber to extend obliquely with respect to a longitudinal direction of the electric vehicle, wherein the link member is rotated upwardly about the hinge axis when the obstacle collides with the protection plate.

20. The safety system of claim 19, further comprising an obstacle sensor provided at a front side of the electric vehicle for detecting the obstacle to generate a detection signal; and a lifting unit connecting the link member with the bottom surface of the electric vehicle to rotate the link member, wherein when the detection signal is generated by the obstacle sensor, the link member is rotated upwardly about the hinge axis by the lifting unit.

21. The safety system of claim 20, wherein the lifting unit includes an electric motor or a hydraulic cylinder.

22. The safety system of claim 19, further comprising one or more pairs of safety wheels arranged at a bottom surface of the supporting member, wherein the diameters of the safety wheels are larger than a height of the power acquisition device.

* * * * *